United States Patent
Feng et al.

(10) Patent No.: US 7,568,032 B2
(45) Date of Patent: Jul. 28, 2009

(54) METHOD OF BALANCING LOAD AMONG MIRROR SERVERS

(75) Inventors: Nan Feng, Nanjing (CN); Dong Liu, Beijing (CN); Leo Y. Liu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 09/772,011

(22) Filed: Jan. 29, 2001

(65) Prior Publication Data

US 2001/0025313 A1    Sep. 27, 2001

(30) Foreign Application Priority Data

Jan. 28, 2000 (CN) ............................. 00 1 01180

(51) Int. Cl.
*G06F 15/173* (2006.01)
*G06F 9/46* (2006.01)
(52) U.S. Cl. .................... 709/226; 709/241; 718/105
(58) Field of Classification Search ................ 709/226
See application file for complete search history.

(56) References Cited

U.S. PATENT DOCUMENTS

| | | | | |
|---|---|---|---|---|
| 6,003,083 A | * | 12/1999 | Davies et al. | 709/226 |
| 6,078,960 A | * | 6/2000 | Ballard | 709/229 |
| 6,112,239 A | * | 8/2000 | Kenner et al. | 709/224 |
| 6,175,869 B1 | * | 1/2001 | Ahuja et al. | 709/226 |
| 6,182,139 B1 | * | 1/2001 | Brendel | 709/226 |
| 6,560,717 B1 | * | 5/2003 | Scott et al. | 714/4 |

OTHER PUBLICATIONS

Triantafillou, Peter and Neilson, Carl, "Achieving Strong Consistency in a Distributed File System," Jan. 1997, IEEE, vol. 23, Issue 1, pp. 35-55.*
Herrin II, Eric H. and Finkel, Raphael A. "The Benefits of Service Rebalancing," Apr. 1992, IEEE, pp. 104-110.*
Yoshikawa et al, "Using Smart Clients to Build Scalable Services," Jan. 1997, USENIX 1997 Annual Technical Conference, pp. 1-13.*

* cited by examiner

*Primary Examiner*—Patrice Winder
*Assistant Examiner*—Azizul Choudhury
(74) *Attorney, Agent, or Firm*—Douglas W. Cameron; Anna Vachon Dougherty

(57) ABSTRACT

A method for balancing load among a plurality of mirror servers, wherein a user may select and get access to any one of said plurality of mirror servers within an identical web page, comprising steps of: (1) when said web page is accessed by a client, transmitting not only said web page but also a predetermined script to said client; (2) automatically executing said script at said client so as to respectively create connections with each of said plurality of mirror servers and measure respective response times; (3) selecting the mirror server having the shortest response time for users to access.

19 Claims, 3 Drawing Sheets

METHOD OF BALANCING LOAD AMONG MIRROR SERVERS

FIELD OF THE INVENTION

The present invention relates to a method and apparatus that can balance load among a plurality of mirror servers, and more particularly to a method of balancing the servers load with the active participation of clients.

BACKGROUND OF THE INVENTION

World Wide Web (WWW) is a multimedia information retrieval system on the Internet. It is the most common way to transfer data over Internet. Some other means include FTP (File Transfer Protocol), Gopher, etc. On the web, clients can achieve transactions on servers by HTTP (Hypertext Transfer Protocol), and HTTP is a well-known application protocol. This protocol allows clients to use standard HTML (Hypertext Markup Language) pages to access all kinds of files (Text, Image, Sound, Video and etc). HTML files provide the fundamental file format and enable developers define links, which link to other server sites. Under Internet circumstance, we can use URL (Uniform Resource Locator) to define a certain servers address or even the network path. URL has a special syntax to define the network path.

A typical URL includes http followed by www.yourcompany.com/path, where "your_company" is the host server name, "path" is the directory, in which page can be found. A Name Server can translate a URL into an IP address. A Name Server on Internet is called DNS (Domain Name Server). The process by which web clients ask DNS to translate a host name to an IP address is called resolution. In TCP/IP, the Name Server will translate the Host Name into one or several IP address lists. The IP list will be sent back to those clients who ask HTTP requests. Each IP address locates a server, this server will process the request sent by a web client using a web browser.

WWW adopts HTML and follows Client/Server architecture. HTTP service client uses web browsers, which can send all kinds of requests to the server and display the HTML files (sent back from the server) on the screen.

With thousands of companies, universities, and government organizations posting their own Home Pages on the Internet, the Internet becomes a very precious information resource. Even a new user with only a little practice can visit millions of pages and thousands of new groups Internet accesses and the related markets are developing fast too.

In order to provide a high performance service and support for more concurrent users, some big companies setup several mirror servers. All these servers are deployed in different regions or even different countries. Each server has its unique network path (URL) but provides the same service functions.

But, the deployment of the server is always determined by experiences and cannot reflect the real access pattern. If the regions are not select wisely, overload costs will increase inevitably.

Even worse, most users choose a site from a list of mirror sites randomly. The most common way is to select the nearest mirror. But, the complicated situations in the network cannot make sure the nearest one is the fastest one.

For example, if a user wanted to download certain software from Internet, he or she would get a list of server sites. Each server in this list, such as www.download.com, www.microsoft.com and www.linux.org, could provide this software. In most cases, a user wants to select the fastest one, by which he could get what he wants in the minimum time. Unfortunately, most users are not network specialists, or they don't have enough network tools. So, most of them will select one of them randomly. Another possible situation is that some users will select the nearest site by location. They assume that the nearest site should have the shortest response time. Unfortunately again, the network speed to some site is determined by the workload of the server, the topology of the network, and some other more important issues. As users cannot take the real load of a server into account before their selection, different mirrors may have different work statuses. The workload is not well balanced among these servers. At worst, if a user selected a server with a heavy load already but with the nearest location, he might have to spend a longer time to download the software than he wanted.

Due to the consequences of deployment and blindfold selection, the load among mirror sites is not balanced. So the overall performance of the Internet is decreased. For reasons above, it is a very critical problem to balance the load among the mirrors.

As we know, the current load balance methods only deal with the LAN, and all these methods only work on the server side. In order to make the balance transparent to end-users, all these methods must be devised carefully. Due to these limitations, all these methods which have been designed for the LAN cannot be used on Internet directly and easily.

The first object of this invention is to provide a method, which can balance the load among mirrors with clients' active participation. The method just needs a few modifications on clients.

The second object of this invention is to provide an apparatus, which can balance the servers' load and this apparatus can be easily installed into clients.

SUMMARY OF THE INVENTION

In order to achieve the first object, this invention provides a method for balancing load among a plurality of mirror servers, wherein a user may select and get access to any one of said plurality of mirror servers within an identical web page, said method comprising the steps of:

(1) when said web page is accessed by a client, transmitting not only said web page but also a predetermined script to said client;

(2) automatically executing said script at said client so as to respectively create connections with each of said plurality of mirror servers and measure respective response times; and (3) selecting a mirror server having the shortest response time for the users to access.

In order to achieve the second object, this invention provides an apparatus for balancing load among a plurality of mirror servers, characterized by being installed in a client machine and comprising:

a script analyzer, for analyzing a predetermined script received by a client;

a script executor, for respectively creating connections with each of said plurality of mirror servers and measuring respective response times based on analyzed result from said script analyzer; and a selector, for selecting the mirror server having the shortest response time for users to access.

The method and apparatus of this invention can reflect the real circumstance more accurately with the help of a client's active participation. Although this method needs participation of clients, all of these actions could be done transparent to the clients, such that the end-users will never be aware of it.

Another benefit of this invention is that this method can help the end-user find the fastest server from a list to accelerate the request-response cycle easily.

Besides, the apparatus of this invention can help mirror sites get the desired information from its clients automatically. This information may help network administrators to analyze clients' access patterns. By counting the connections, administrators can control mirror servers more effectively. For example, an administrator may add some servers to that place where many connections occur and remove some servers from the place where only a few connections occur.

BRIEF DESCRIPTION OF THE DRAWINGS

By the attached figures, we will illustrate the embodiment of this invention in details. The benefits and advantages of this invention will become more obvious.

DETAILED DESCRIPTION OF THE INVENTION

Figure 1:
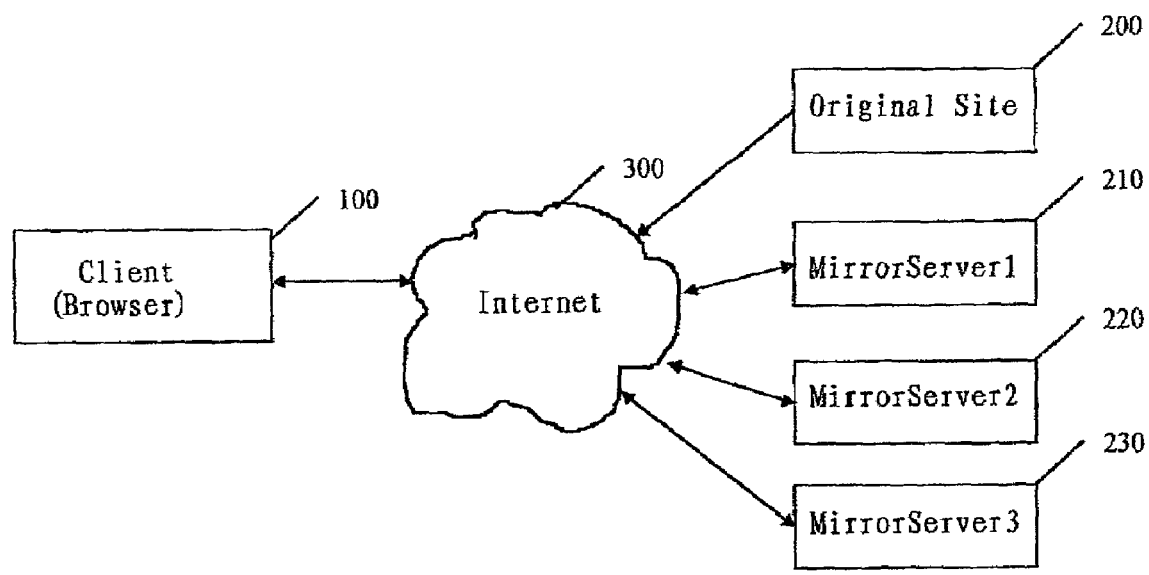
FIG. 1 is the running environment of this invention.

Next, we will describe the preferred embodiment of this invention. In FIG. 1, a client 100 sets up a connection with a host server 200 through Internet 300. In this example, the client 100 might use any kind of browsers, such as Internet Explorer from Microsoft or Netscape Communicator. After the connection was set up, the Client 100 got a page and showed this page to the end-user. In this page, a lot of mirror sites' URL addresses were listed. In FIG. 1, we drew three mirror servers. They are mirror server 210, mirror server 220 and mirror server 230. The user could use some kind of pointing device, such as a mouse, to choose a site he wanted to visit. Client 100 and each server complied with the Client/Server architecture, as we all know. Numeral 300 stands for Internet.

To implement this invention into FIG. 1, we need some work on the client only. Before we implement the invention, we must build some small scripts and store them on the host 200. By doing some small tricks on the client (installing a certain small software or downloading it from the Internet automatically, this software can interpret the script we wrote on the host), the scripts can be run without the end-users' awareness after they were downloaded together with the page. The method to build the script and the interpret engine is quite known in the computer field.

In the script, we can define the URL address of each mirror site (URL), connection time-out settings, times of retry connection, etc. As an extension, we can write some feedback information in the script too. These feedbacks include the IP address of clients, domain names, operation platforms, browser types, etc.

When the host server 200 gets the request from the client 100, the host server 200 sends the requested page together with the script we already had written. After getting the script, the client 100 would run the script automatically as well as displaying the page to the users.

The script interpret engine would set up connections to each mirror site according to the description in the script and would measure the response time from the servers. Here, all the action may be done in a multi-thread mode. Then, by analyzing the response time of each server, a server with the shortest response time would be selected. We had many choices to show this result to users. For example, we could show a list with all servers and its response time on, and use some special graphics work on the fastest one to make it more outstanding. Of course, the display method does not belong to this invention.

We may implement the script interpreter as a plug-in card, and store them on the server site 200. The script can be restarted by users as well as starting by itself.

Figure 2:
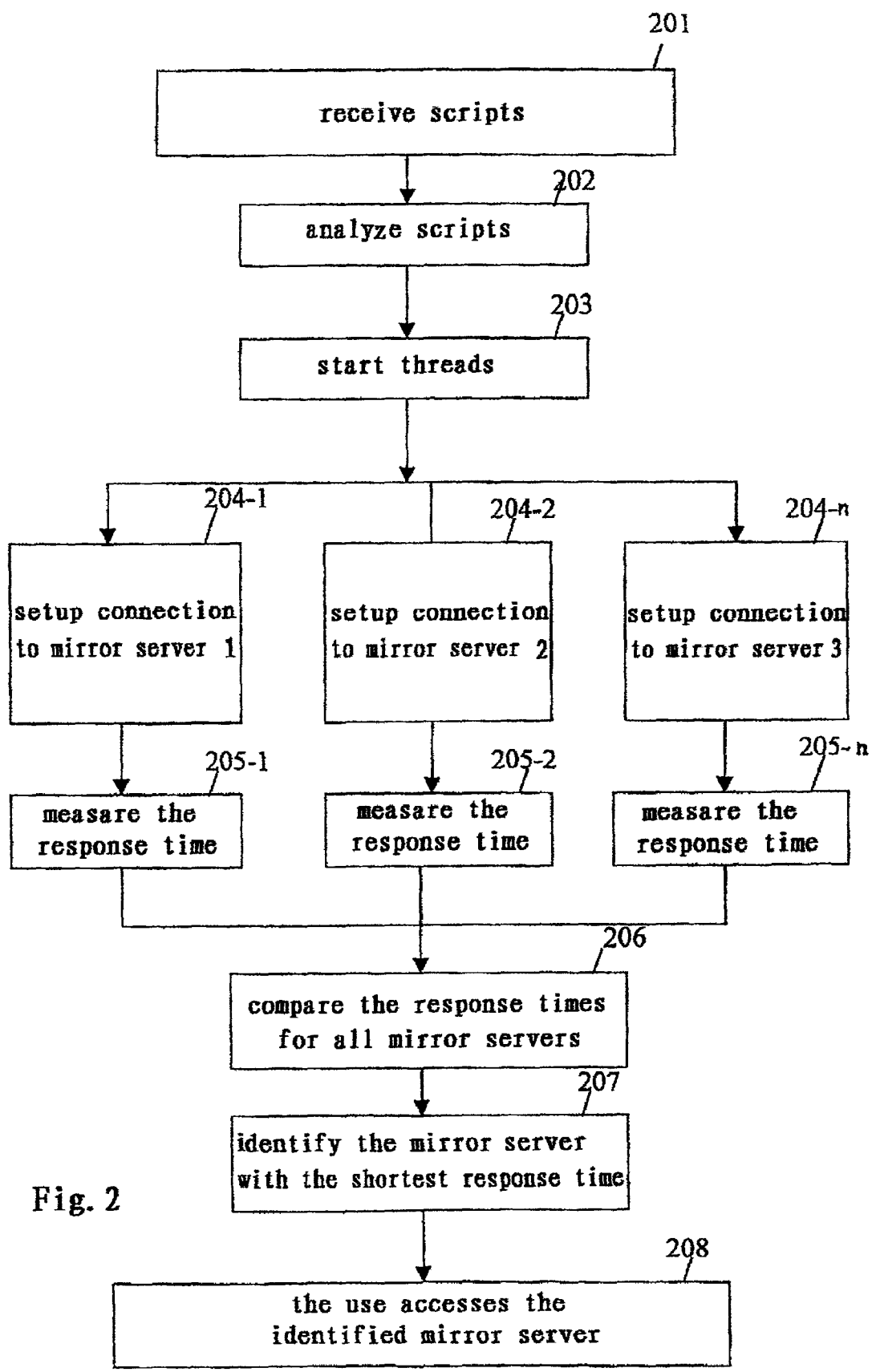
FIG. 2 is the flowchart of the method, which can balance the load among popularity mirror servers.

In FIG. 2, we illustrate the working process of this invention in more detail. In step 201, scripts are received from the host server. In step 202, the scripts are analyzed to get the desired information. In step 203, several threads are started according to the analysis results. These threads will finish step 204-1,204-2, . . . ,204-n and 205-1,205-2, . . . ,205-n. Here n stands for the number of mirrors. The interrupter will start one thread to one mirror.

Take the mirror 1 as an example. In step 204-1, setup a connection with the first mirror. Then, in step 205-1 it will measure the response time of mirror 1. In step 206, all response times from different servers are compared here, and the one with the shortest response time is selected. In step 207, the fastest site is shown to the end-users. Finally, in step 208, the end-users may select the fastest to send his subsequent requests.

By using this invention, the mirror server with the shortest response time can be selected automatically, and this selection can be made while the user is accessing the host 200 dynamically. That is to say, the site with the shortest response time is determined dynamically too. Because, in most cases, users prefer the fastest site, the load for mirror 210, mirror 220 and mirror 230 is balanced with the active participation of the users.

Table 1 gives out a sample script, which can be processed in FIG. 2. In this script, HTTP is the connection protocol. Three mirror servers are defined. Their URLs is www1.ibm.com, www2.ibm.com and www3.ibm.com. Connection Time-Out is 100 seconds. During the measurement, it will test the target server three times and calculate the average time. This script also defines that it will stop as long as it finds the fastest one. Users can restart the script. After the connections are setup, clients will send some information back to servers, such as IP address, Platform name and browser type.

TABLE 1

Figure 3:
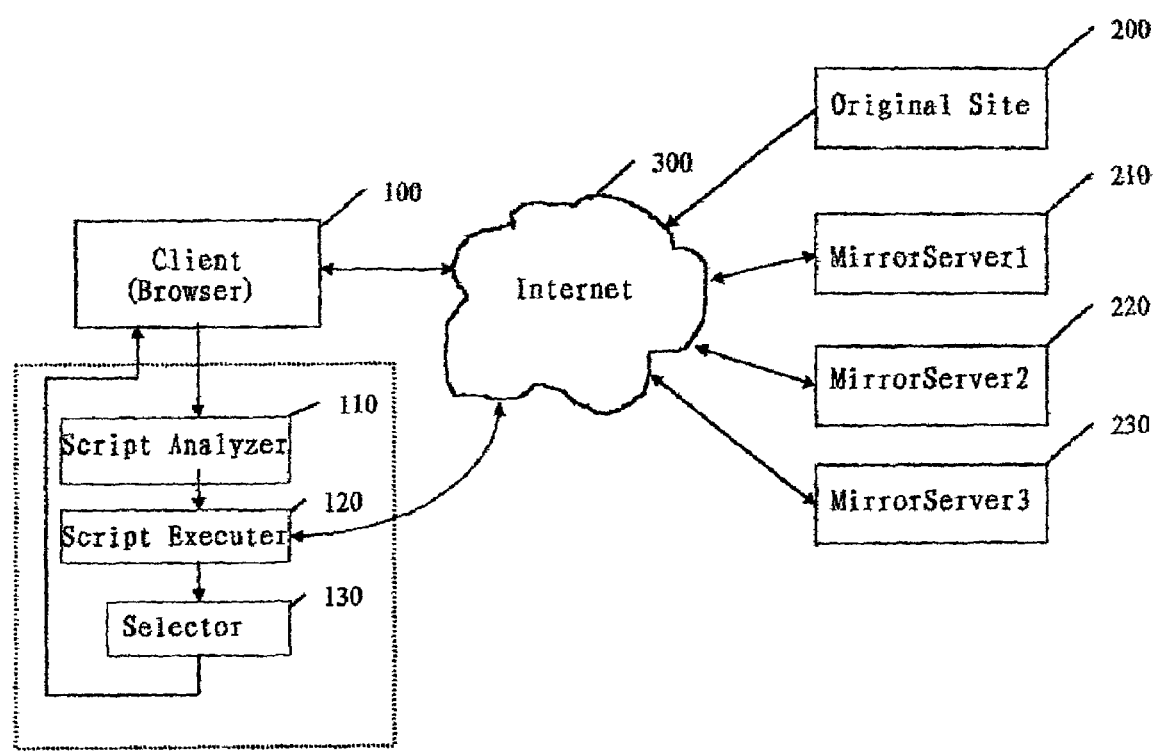
FIG. 3 depicts the framework of the apparatus, which may help the balance among popularity mirror servers.

This is a sample script
Define connection type
CONNECT=HTTP
List all mirrors
SITES=www1.ibm.com, www2.ibm.com, www3.ibm.com
Define the Time-Out
TIMEOUT=100
Test each mirror three times.
TEST_COUNT=3
Stop the script as long as find the fastest one
DISPLAY_COUNT=1
Users can restart the script by hand
CAN_RESTART=TRUE
Feedbacks to server
FEEDBACK=IPADDRESS, PLATFORM, BROWSERTYPE FIG. 3 depicts how to use an apparatus to balance the load among mirror servers. We can install such apparatus into clients just like the dot-line shown in FIG. 3. The client 100 can execute the apparatus and get results from the apparatus. This apparatus includes a script analyzer 110, a script interpreter 120 and a selector 130. After clients get scripts from the original host server 200, the script will be sent to the script analyzer 110. The script analyzer 100 will analyze this script and get the information defined in it, such as URLs for each mirror site, connection time-out setting, times of retries, clients feedbacks and etc. The script interpreter 120 will set up connections and measure each server's response time according to the analyzed results from the script analyzer 110. The selector 130 will choose the mirror server with the shortest response time for users next action.

Although we have discussed the preferred embodiment of this invention in conjunction with the drawings, it is still very easy for those skilled in the art to make some modifications without departing from the spirit of this invention. So, the scope of this invention is just limited by the claims.

What is claimed is:

1. A method for balancing load among a plurality of mirror servers, wherein a user may select and get access to any one of said plurality of mirror servers within an identical web page, said method comprising the steps of:
    (1) each time a web page is accessed by a client in response to user input to establish a session to browse said web page, receiving said web page and a predetermined script at said client;
    (2) automatically executing said script at said client so as to respectively create connections with each of said plurality of mirror servers and measure respective current response times; and
    (3) selecting a mirror server having the shortest current response time as a selected mirror server to handle the user's next action with said web page during the session.

2. The method according to claim 1, wherein said automatically executing said script comprises steps of:
    calling a predetermined engine by said client; and
    executing said script by said engine, comprising creating connections with each of said plurality of mirror servers and measuring respective response times.

3. The method according to claim 1, wherein said executing said script is performed in a multi-thread manner for said plurality of mirror servers.

4. The method according to claim 1, further comprising sending the client information to the mirror servers being connected.

5. The method according to claim 4, wherein said client information includes at least one of IP address, domain name, platform name, platform version, and browser type of said client.

6. The method according claim 1, wherein said connections are created through proxies.

7. The method according to claim 1, wherein said script can be restarted by said user during said session.

8. The method according to claim 1, further comprising comparing respective response times of said plurality of mirror servers.

9. The method according to claim 8, further comprising the steps of:
    notifying said user of the mirror server having the shortest response time;
    receiving user input selecting one of said mirror servers as the selected mirror server; and
    establishing access for the user to the selected mirror server.

10. An apparatus for balancing load among a plurality of mirror servers said apparatus being installed in a client machine and comprising:
    a client communications device for accessing a web site in response to user input to establish a session to browse said web site and for receiving a web page and a predetermined script;
    a script analyzer, for analyzing a predetermined script received by a client in response to said client accessing a web page;
    a script executor, for respectively creating connections with each of said plurality of mirror servers and measuring respective current response times based on analyzed result from said script analyzer; and
    a selector, for selecting the mirror server having the shortest current response time as a selected mirror server to handle the user's next request during said session with said web site.

11. The apparatus according to claim 10, wherein said predetermined script is transmitted together with a web page to said client.

12. The apparatus according to claim 10, wherein said script executor operates in a multi-thread manner for said plurality of mirror servers.

13. The apparatus according to claim 10, wherein said script executor is additionally adapted to send the client information to the mirror servers being connected.

14. The apparatus according to claim 13, wherein said client information includes at least one of IP address, domain name, platform name, platform version, and browser type of said client.

15. The apparatus according claim 10, wherein said script executor makes connections with mirror servers through the proxies.

16. The apparatus according to claim 10, wherein said script executor can be re-started by said user so as to execute said script during said session.

17. The apparatus according to claim 10, wherein said selector comprises a comparator for comparing respective response times of said plurality of mirror servers.

18. The apparatus according to claim 17, wherein said selector further comprises:
    means for notifying said user of the mirror server having the shortest response time; and
    means for receiving selection made by a user on the mirror servers.

19. A program storage device readable by machine tangibly embodying a program of instructions executable by the machine to perform a method for balancing load among a plurality of mirror servers, wherein a user may select and get access to any one of said plurality of mirror servers within an identical web page, said method comprising the steps of:
    (1) each time a web page is accessed by a client in response to user input to browse said web page, receiving said web page and a predetermined script at said client;
    (2) automatically executing said script at said client so as to respectively create connections with each of said plurality of mirror servers and measure respective current response times; and
    (3) selecting a mirror server having the shortest current response time as a selected mirror server to handle the user's next action with said web page during the session.

* * * * *